(12) United States Patent
Kroner et al.

(10) Patent No.: US 11,359,658 B2
(45) Date of Patent: Jun. 14, 2022

(54) STRUCTURED SURFACE WITH ADHESION SWITCHABLE IN STAGES

(71) Applicant: Leibniz-Institut für Neue Materialien gemeinnützige GmbH, Saarbrücken (DE)

(72) Inventors: Elmar Kroner, Saarbrücken (DE); Paula Yagüe Isla, Saarbrücken (DE)

(73) Assignee: Leibniz-Institut für Neue Materialien gemeinnützige GmbH, Saarbrücken (DE)

( * ) Notice: Subject to any disclaimer, the term of this patent is extended or adjusted under 35 U.S.C. 154(b) by 225 days.

(21) Appl. No.: 15/535,724

(22) PCT Filed: Dec. 16, 2015

(86) PCT No.: PCT/EP2015/079955
§ 371 (c)(1),
(2) Date: Jun. 14, 2017

(87) PCT Pub. No.: WO2016/102264
PCT Pub. Date: Jun. 30, 2016

(65) Prior Publication Data
US 2018/0223886 A1    Aug. 9, 2018

(30) Foreign Application Priority Data
Dec. 22, 2014   (DE) .................... 10 2014 119 470.5

(51) Int. Cl.
*F16B 5/07*   (2006.01)
*B32B 3/26*   (2006.01)
*C09J 7/00*   (2018.01)

(52) U.S. Cl.
CPC ............... *F16B 5/07* (2013.01); *B32B 3/263* (2013.01); *C09J 7/00* (2013.01); *B32B 2250/03* (2013.01);
(Continued)

(58) Field of Classification Search
CPC . B32B 3/263; B32B 2250/03; B32B 2307/70; F16B 5/07; C09J 7/00; C09J 2301/31
See application file for complete search history.

(56) References Cited

U.S. PATENT DOCUMENTS 5,819,391 A    10/1998   Matushima et al.
5,889,118 A    3/1999    Delgado et al.
(Continued)

FOREIGN PATENT DOCUMENTS

CN    103328684    9/2013
DE    102 23 234 B4    2/2005
(Continued)

OTHER PUBLICATIONS

Alla Synytska et al, "A comparative study on switchable adhesion between thermoresponsive polymer brushes on flat and rough surfaces," May 13, 2011, Royal Society of Chemistry—Soft Matter, Issue 7, pp. 5691-5696 (Year: 2011).*
(Continued)

*Primary Examiner* — Maria V Ewald
*Assistant Examiner* — Ethan Weydemeyer
(74) *Attorney, Agent, or Firm* — Cahn & Samuels, LLP

(57) ABSTRACT

A structured surface has at least two types of projections which differ from one another at least in terms of their vertical height. As a result, the adhesion of the structured surface can be switched between at least three different states.

22 Claims, 15 Drawing Sheets

(52) U.S. Cl.
CPC ....... *B32B 2307/70* (2013.01); *C09J 2301/31* (2020.08)

(56) References Cited

U.S. PATENT DOCUMENTS

| | | |
|---|---|---|
| 6,491,851 B1 | 12/2002 | Keller et al. |
| 6,773,535 B1 | 8/2004 | Wetzel |
| 7,229,685 B2 | 6/2007 | Full et al. |
| 8,153,254 B2 | 4/2012 | Arzt et al. |
| 8,266,938 B2 | 8/2012 | Bradley et al. |
| 8,592,034 B2 | 11/2013 | Rule et al. |
| 9,290,678 B2 | 3/2016 | Arzt et al. |
| 10,046,541 B2 | 8/2018 | Schneider et al. |
| 10,351,733 B2 | 7/2019 | Hensel et al. |
| 2004/0058121 A1 | 3/2004 | Schriefer et al. |
| 2004/0076822 A1 | 4/2004 | Jagota et al. |
| 2004/0175555 A1 | 9/2004 | Ogisu |
| 2006/0005362 A1 | 1/2006 | Arzt et al. |
| 2008/0202637 A1 | 8/2008 | Hector et al. |
| 2008/0280085 A1 | 11/2008 | Livne |
| 2009/0053472 A1 | 2/2009 | Spatz et al. |
| 2009/0217492 A1 | 9/2009 | Gallant et al. |
| 2010/0021647 A1 | 1/2010 | Sitti et al. |
| 2010/0080951 A1 | 4/2010 | Del Campo et al. |
| 2011/0048096 A1 | 3/2011 | Bradley et al. |
| 2011/0300358 A1 | 12/2011 | Blohowiak et al. |
| 2012/0101567 A1 | 4/2012 | Jansen |
| 2012/0328822 A1 | 12/2012 | Sitti et al. |
| 2013/0236732 A1 | 9/2013 | de Oliveria et al. |
| 2015/0274904 A1 | 10/2015 | Yamamoto et al. |

FOREIGN PATENT DOCUMENTS

| | | |
|---|---|---|
| DE | 102006050365 A1 | 4/2008 |
| DE | 10 2009 046 756 A1 | 5/2010 |
| DE | 102009037739 A1 | 12/2010 |
| DE | 102010034954 A1 | 4/2011 |
| DE | 10 2012 100 933 A1 | 8/2012 |
| EP | 1 241 930 B1 | 12/2000 |
| JP | S58018934 U | 2/1983 |
| JP | H04309583 A | 11/1992 |
| JP | H06123040 A | 5/1994 |
| JP | 2000334888 A | 12/2000 |
| JP | 2004262191 A | 9/2004 |
| JP | 2007083317 A | 4/2007 |
| JP | 2012065826 A | 4/2012 |
| JP | 2012530006 A | 11/2012 |
| KR | 0180498 | 2/1999 |
| WO | 03/099951 A2 | 12/2003 |
| WO | 2005101466 A2 | 10/2005 |
| WO | 2007/096082 A1 | 8/2007 |
| WO | 2009/053714 A1 | 4/2009 |
| WO | 2014124352 A1 | 8/2014 |
| WO | 2019129463 A1 | 7/2019 |
| WO | 2019129476 A1 | 7/2019 |
| WO | 2019129508 A1 | 7/2019 |
| WO | 2019129540 A1 | 7/2019 |

OTHER PUBLICATIONS

Won-Gyu et al., "Instantly Switchable Adhesion of Bridged Fibrillar Adhesive via Gecko-Inspired Detachment Mechanism and Its Application to a Transportation System", Nanoscale, 2013, 5, 11876-84.
Won-Gyu et al., "Fabrication and Analysis of Enforced Dry Adhesives With Core-Shell Micropillars", Soft Matter, 2013, 9, 1422-27.
Paretkar et al., "Bioinspired Pressure Actuated Adhesive System", Materials Science and Engineering C, 31 (2011), 1152-59.
Paretkar et al., "In Situ Observation of Contact Mechanisms in Bioinspired Adhesives at High Magnification", MRS Communications (2011), 1-4.
Varenberg et al., "Close-Up of Mushroom-Shaped Fibrillar Adhesive Microstructure: Contact Element Behavior", Journal of The Royal Society Interface, 2008, 5, 785-89.
English Abstract of DE 102006050365, Apr. 30, 2008.
English Abstract of CN 103328684, Sep. 25, 2013.
English Abstract of KR 0180498, Feb. 1, 1999.
English Abstract of DE 102010034954.
English Abstract of DE 102009037739.
International Preliminary Report on Patentability dated Jul. 6, 2017.
English Abstract of JP 2000334888, Dec, 5, 2000.
English Abstract of JP 2004262191, Sep. 24, 2004.
English Abstract of JP H06123040, May 6, 1994.
English Abstract of JP H04309583, Nov. 2, 1992.
Partial Machine Translation of JP S58018934, Feb. 5, 1983.
Khaderi et al., "Detachment of an adhered micropillar from a dissimilar substrate", Journal of the Mechanics and Physics of Solids, 75 (2015) 159-183.
Kroner et al., "Note: An adhesion measurement setup for bioinspired fibrillar surface using flat probes", Review of Scientific Instruments 83, 016101-1 to 016101-3 (2012).
Akisanya et al., "Interfacial Cracking from the Free-Edge of a Long Bi-Material Strip", Int. J. Solids Structures, vol. 34, No. 13, 1645-1665, 1997.
Bae et al., "Enhanced Skin Adhesive Patch with Modulus-Tunable Composite Micropillars", Adv. Healthcare Mater., 2013, 109-113.
English Abstract of WO 03/099951 A2.
English Abstract of DE 10 2009 046 756 A1.
English Abstract of DE 102 23 234 A1.
English Abstract of DE 10 2012 100 933 A1.
English Abstract of WO 2007/096082 A1.
English Abstract for JP2007083317 A, Apr. 5, 2007.
English Abstract for JP2012065826 A, Apr. 5, 2012.

* cited by examiner a)

b)

a)

b)

STRUCTURED SURFACE WITH ADHESION SWITCHABLE IN STAGES

This patent application is a U.S. national stage application of PCT international application PCT/EP2015/079955 filed on 16 Dec. 2015 and claims priority of German patent document DE 10 2014 119 470.5 filed on 22 Dec. 2014, the entirety of which is incorporated herein by reference.

FIELD OF THE INVENTION

The invention relates to surfaces with switchable adhesion and to a method for producing such surfaces.

BACKGROUND OF THE INVENTION

Switchable adhesion is of great importance for many applications. Connections by means of bonded joints are frequently suitable only for a one-off application, or quickly wear out in the case of multiple use.

An important field of reversible adhesive connection is dry adhesion on the basis of Van der Waals forces, similar to Gecko structures. These structures are detachable and can also be used repeatedly. It is problematic, however, that the adhesive force of a surface can be influenced only to a limited degree.

The object of the invention is to define a structured surface, the adhesive force of which can be altered and which has a switchable adhesion. In addition, a method for producing such surfaces is defined.

SUMMARY OF THE INVENTION

This object is achieved by the inventions having the features of the independent claims. Advantageous refinements of the inventions are characterized in the subclaims. The wording of all claims is herewith formulated by reference to the content of this description. The inventions also embrace all sensible and, in particular, all mentioned combinations of independent and/or dependent claims.

The object is achieved by a structured surface, wherein the surface has a structuring comprising a multiplicity of projections, which respectively have at least a trunk, wherein the trunk possesses an end face pointing away from the surface, characterized in that the multiplicity of projections comprises at least two types of projections, which differ from one another at least in terms of the vertical height of the end face, and the material of the projections has a modulus of elasticity such that, depending on the load, one or more types of projections form via their end faces an adhesive force which is higher than the force exerted by the possible compression of the projections; and at least one type of projections has an aspect ratio such that, if a specific load is exceeded, these projections buckle and the adhesive force, as a result of buckling of the end faces, strongly decreases.

By the vertical height of the end face is understood the distance of the end face from the surface on which the projections are disposed.

In a preferred embodiment of the invention, the buckling of the end faces is reversible. Preferredly, the deformation of the projections is reversible. The projections are sufficiently elastic, so that the structured surface can revert to its no-load state.

In a preferred embodiment of the invention, the projections of the structured surface of the invention are of pillar-like configuration. This means that the projections in question are preferably configured perpendicular to the surface, said projections having a trunk and an end face, wherein the trunk and the end face can have any chosen cross section (for instance circular, oval, rectangular, square, rhombic, hexagonal, pentagonal, etc.).

Preferredly, the projections are configured such that the vertical projection of the end face onto the base surface of the projection forms with the base surface an overlap area, wherein the overlap area and the projection of the overlap area onto the end face spans a body which lies fully within the projection. In a preferred embodiment of the invention, the overlap area comprises at least 50% of the base surface, preferredly at least 70% of the base surface, particularly preferredly the overlap area comprises the whole of the base surface.

In a preferred embodiment, the end face is aligned parallel to the base surface and to the surface. If the end faces are not aligned parallel to the surface and therefore have different vertical heights, as the vertical height of the projection is regarded the average vertical height of the end face.

In a preferred embodiment, the end face of the projections is larger than the base surface.

In a preferred embodiment of the invention, the trunk of the projection, related to its average diameter, has an aspect ratio of height to diameter of 1 to 100, preferredly of 1 to 10, particularly preferredly of 2 to 5.

By the average diameter is here understood the diameter of the circle which has the same area as the corresponding cross section of the projection, averaged over the entire height of the projection.

In a further embodiment of the invention, the ratio of the height of a projection to the diameter, at a specific height over the entire height of the projection, is always about 1 to 100, preferredly about 1 to 10, particularly preferredly about 2 to 5. By diameter is understood the diameter of the circle which has the same area as the corresponding cross section of the projection at the defined height.

At least one type of projections can have broadened end faces, so-called "mushroom" structures.

The aspect ratio of the trunk is important for the compression and the buckling at too high a load.

The end faces of the projections can themselves be structured to increase their surface. In this case, as the vertical height of the projections is regarded the average vertical height of the end face.

In a preferred embodiment, the vertical height of all projections lies within a range from 1 µm to 2 mm, preferredly within a range from 10 µm to 2 mm.

In a preferred embodiment, the base surface, in terms of area, corresponds to a circle having a diameter between 1 µm and 1 mm, preferredly between 10 µm and 500 µm. In one embodiment, the base surface is a circle having a diameter between 1 µm and 1 mm, preferredly between 10 µm and 500 µm.

The average diameter of the trunks lies preferredly between 1 µm and 1 mm, preferredly between 10 µm and 500 µm. Preferredly, the height and average diameter is adapted in accordance with the preferred aspect ratio.

In a further embodiment of the invention, at least one type of projections has broadened end faces, wherein, for this type of projections, the cross-sectional area in the upper third of the vertical height increases through to the broadened end face.

In a preferred embodiment, in the case of broadened end faces, the surface area of the end face of a projection is at least 1.01 times, preferredly at least 1.5 times as large as the area of the base surface of a projection. For instance, it can be larger by a factor of 1.01 up to 20.

In a further embodiment, the end face is between 5% and 100% larger than the base surface, particularly preferredly between 10% and 50% of the base surface.

In a preferred embodiment, the distance between two projections is less than 2 mm, in particular less than 1 mm.

In a further preferred embodiment of the invention, the different types of projections are arranged mixed, particularly preferredly such that, on the structured surface, no 10, 5, 4, 3, 2 or 1 projection(s) of one type are, or is, surrounded only with projections of the same type. In particular, each projection of one type is always surrounded by at least one projection of a different type. Preferredly, for one projection, all those projections to whose centroid of the base surface a straight line can be drawn from the centroid of the base surface of the considered projection, which straight line intersects no base surface of another projection, are here regarded as surrounding.

The at least two types of projections differ from one another at least in terms of their vertical height of the end face. Each type of projections having the same vertical height therefore spans, in terms of this vertical height, a contact area. When contact is made with a substrate, these contact areas, depending on the load, enter successively into contact with the substrate. Preferredly, the respectively spanned contact areas are arranged parallel to the surface on which the projections are disposed. Particularly preferredly, the projections are arranged such that, when contact is made with a substrate, all projections of one vertical height make contact in this region with the substrate.

The possible differences in the vertical height of the projections are dependent, above all, on the chosen aspect ratio and the modulus of elasticity of the projections. The projections must be able to be compressed without buckling of the end faces at least up to the point of contact with the type of projections of a second vertical height.

Preferredly, the differences in height are chosen such that they are realized by compression of the projections within a range of elastic behavior of the projections. This can be determined by simple measurements. If this range is exceeded, irreversible plastic deformation of the projections generally ensues, for instance as a result of bending. Since the elasticity of the material is limited, this deformation also causes the end faces which are in contact with a substrate to irreversibly realign themselves relative to the substrate. In an extreme case, the end face is even partially detached from the substrate. This can be utilized for irreversible one-off switching operations.

In a further embodiment, the differences in height are chosen such that at least the type of projections having the highest vertical height can be compressed, at least up to the point of contact of projections having the next lower vertical height, preferredly at least up to the point of contact of the type of projections having the lowest vertical height.

In a preferred embodiment of the invention, primarily the projections are deformed, and not the surface on which the projections are disposed.

In a further embodiment of the invention, the modulus of elasticity of the projections lies between 10 kPa and 10 GPa.

In a preferred embodiment, the height difference between the type of projections having the highest vertical height and the type of projections having the lowest vertical height lies between 1% and 30% of the lowest vertical height, preferredly between 2% and 20%.

The invention additionally relates to a method for modifying the surface of an object in order to obtain a surface with switchable adhesion, wherein the surface is subjected to a structuring, so that a multiplicity of projections are formed, which projections respectively have at least a trunk, wherein the trunk possesses an end face pointing away from the surface, wherein the multiplicity of projections comprises at least two types of projections, which differ at least in terms of the vertical height of the end face relative to the surface; and the material of the projections has a modulus of elasticity such that, depending on the load, one or more types of projections form via their end faces an adhesive force which is higher than the force exerted by the possible compression of the projections; and at least one type of projections has an aspect ratio such that, if a specific load is exceeded, these projections buckle and the adhesive force, as a result of buckling of the end faces, strongly decreases.

The invention further relates to a method for producing a structured surface having at least two types of projections, which differ from one another at least in terms of their vertical height.

Individual method steps are described in greater detail below. The steps do not necessarily have to be performed in the order stated, and the method which is to be portrayed can also have further, unnamed steps.

Further thereto, in a first step a structured surface comprising at least one type of projections is provided. To the end faces of at least some of the projections is applied a hardenable material. If the structured surface has projections having the same vertical height, the material is applied only to some of the end faces of the projections in order to obtain, according to the method, also two types of projections.

Preferredly, a liquid or viscous hardenable material is applied, in particular such that it forms on the end face at least one drop.

Preferredly, the material is applied such that the highest vertical height of the treated projections is higher than the highest vertical height of the projections of the structured surface prior to application. Preferredly, projections having the not lowest vertical height, preferredly the type of projections having the highest vertical height, are treated.

The thus treated projections are now brought into contact with a model for the end face in such a way that the subsequent end face of the elevated projections is formed from the hardenable material.

This contacting can also lead to a broadening of the end faces in relation to the previous projections.

The model can be coated, so that the hardenable material does not adhere, for instance through silanization.

The model can have any chosen form. In the simplest variant it is a plane surface, resulting in elevated projections having plane end faces. The model can also however be structured in order to lend a structure to the generated end face.

In a next step, the hardenable material is hardened. The used method is dependent on the material used. This can be in the form of, for instance, hardening by radiation and/or heat. Preferredly, it is hardening by heat, preferredly by use of a heated model. The model can here be heated already in the contacting process.

In the last step, the structured surface, which now has at least two types of projections, differing from one another at least in terms of their vertical height, is detached from the model.

The hardenable material can be any suitable material. For instance, polymerizable and/or hardenable compounds, such as monomers of polymers, silanes, silicones, are suitable.

The method can also be performed more than once, in order to generate further types of projections having a specific vertical height.

The structured surface according to the invention can also be obtained differently. For instance, two-stage photolithography, 2-photon lithography, molding from appropriate dies, etching methods, milling methods or 3D printing are possible.

The invention additionally relates to a composite of two bodies, wherein the interface has a structured surface according to the invention.

The invention further relates to a method for switching the adhesion of a surface. For this, a structured surface according to the invention is brought into contact with a substrate, wherein, depending on the force exerted on the structured surface, the following cases can be differentiated:

Contacting of the type of projections having the highest vertical height and formation of a low adhesive force. The adhesion now comes about via the end faces of these projections.

Increasing of the force, with compression of the already contacted projections up to the point of contact of the projections having the next lower vertical height, and formation of a, in comparison to the previous state, higher adhesive force. The adhesive force increases as a result of the additional contacting of the new end faces of the end faces which are now also entering into contact with the substrate. However, the formed adhesive force is reduced in the measure of the elastic energy stored in the higher projections as a result of compression thereof. If more than two types of projections are present, this step can be repeated, with an increase in the exerted force, until the end faces of all projections have entered into contact with the substrate. With each type of projections which enter into contact with the substrate, a specific adhesive force is formed. Once all projections have entered into contact, the structured surface has reached its maximum adhesion. The number of types of projections of different vertical height therefore determines the number of possible switchable states of the structured surface.

It is therefore important that the by the enlargement of the contact surface as a result of the contacting by each further type of projections is always greater than the energy to be expended as a result of the compression. Projections having broadened end faces are therefore preferred, since there, above all, the narrower trunk is compressed.

If the force is increased above a specific value, depending on the material and the structure of the structured surface, at least some of the projections will be bent over, preferredly reversibly. As a result, at least some of the end faces lose contact with the substrate. The area available for the adhesion is reduced and the adhesion of the structured surface decreases. Ideally, the structured surface can now be detached without adhesion.

The structured surface according to the invention therefore allows the switchover between at least three states of the adhesion. It is here surprising that a strengthening of the force can lead to the decrease in adhesion.

Further details and features emerge from the following description of preferred illustrative embodiments in conjunction with the subclaims. The respective features can herein be realized in their own right or in plurality in combination with one another. The options for achieving the object are not limited to the illustrative embodiments.

Thus range data always embrace, for instance, all—unstated-intermediate values and all conceivable subranges.

The illustrative embodiments are represented schematically in the figures. Same reference numerals in the individual figures here denote same or functionally identical elements, or elements which are mutually corresponding with respect to their functions. More specifically:

DETAILED DESCRIPTION OF THE INVENTION

Figure 1:
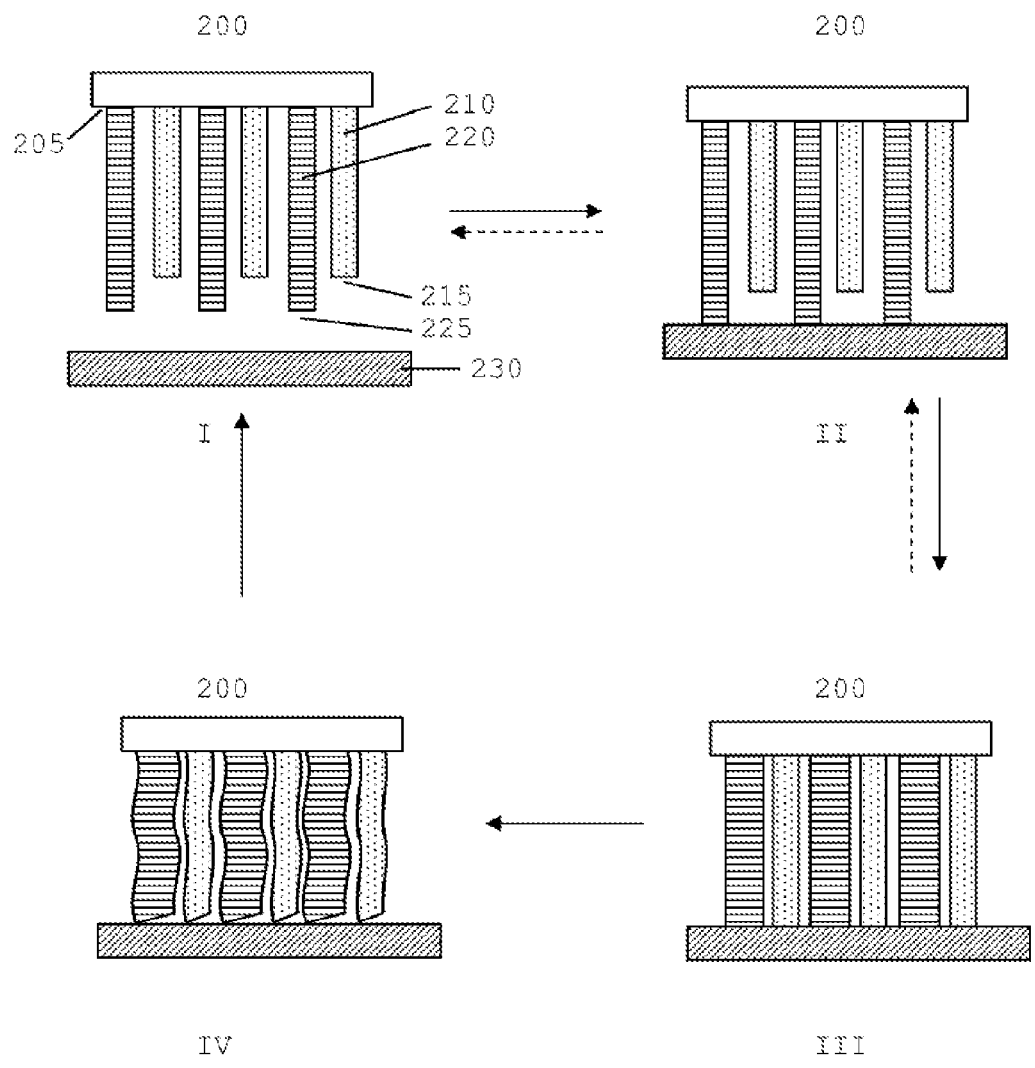
FIG. 1 shows a schematic representation of the method according to the invention.

FIG. 1 shows a schematic representation of switchable adhesion with a surface which is structured according to the invention. The structured surface 200 comprises a first type of projections 210 and at least a second type of projections 220, which differ from one another in terms of their vertical height of their end faces 215, 225. The vertical height is here the distance of the end faces 215, 225 from the surface 205 on which the projections are disposed. The projections have a trunk 210, 220 and an end face 215, 225. This structured surface is moved in step I toward a substrate 230. As shown in II, the projections having the largest vertical height come first into contact with the substrate surface. The end faces 225 of these projections 220 therefore bring about an adhesion of the structured surface 200 on the substrate 230. This force must be overcome in order to redetach the structured surface (as shown by the dashed arrow). This is the situation with a low preload. When the structured surface 200 is moved further toward the substrate 230, the projections 220 already in contact with the substrate will be compressed. Upward from a specific compression or preload, the end faces 215 of the second type of projections 210 also come into contact with the substrate (step III). The surface available for the adhesion is thus at once strongly enlarged. Correspondingly, the force which is necessary for the detachment increases (shown as a dashed arrow, though the detachment of the projections does not always have to proceed via II). If the preload is further increased (illustration IV), then, due to the aspect ratio of the projections, buckling of the projections ensues. Not all projections have to buckle uniformly. What is important is that the end face, and thus the area available for the adhesion, detaches itself from the substrate 230. As a result, the force which is necessary for the detachment drops sharply and the substrate is easy to detach from the surface.

Figure 5:
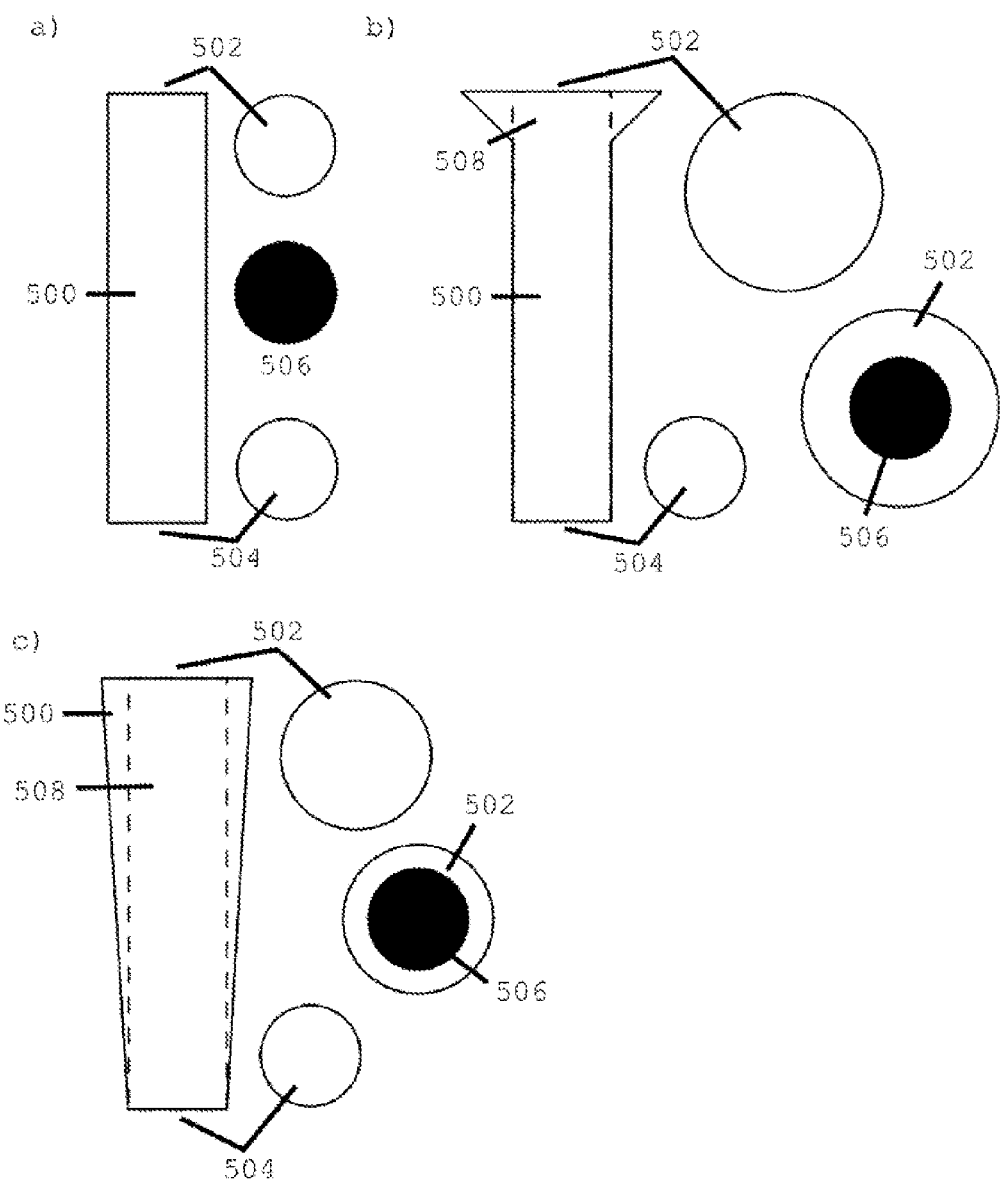
FIG. 5 shows a schematic representation of different embodiments of projections according to the invention.

FIG. 5 shows a schematic representation of preferred embodiments of a projection according to the invention. A projection 500 comprises an end face 502 and a base surface 504. The end face 502 and base surface 504 are shown in side view (left) and top view (right). The black area 506 shows the overlapping region of a vertical projection of the end face 502 onto the base surface 504. It can be identical with the areas a) or, in the case of a broadened end face b) and c), can lie within the end face 502. The body 508 spanned by the projection of the overlap region 506 onto the end face is shown in dashed representation. In all projections it lies within the projection, though in case a) it is identical with the projection itself. "Within" therefore also includes common outer surfaces.

Experiments

1. Production of the specimens

Casting models for the specimens were produced by milling out a plurality of macroscopic pillar arrangements from aluminum. To this end, in a milled-out depression of 3 mm depth, hexagonally arranged round holes having a diameter of 400 μm were milled. Following forming out, the holes produce appropriate pillars. Three different models were produced, a central pillar, a central pillar surrounded by 6 further pillars, and a central pillar surrounded by two rings of, in total, 19 pillars. The holes for the pillars were 1600 μm, 1800 μm and 2000 μm deep. This results in pillars with an aspect ratio (AR, height:diameter) of 4.0, 4.5 and 5. The distance of the holes from center to center was 800 μm for all models. After the milling process, the models were cleaned with isopropanol and any remnants of the milling process removed by repeated forming out.

The specimens were produced from polydimethylsiloxane (PDMS, Sylgard 184, Dow Corning) with a ratio of 10:1 prepolymer and crosslinking agent. All specimens were created by filling of the model with PDMS with the mixed PDMS. After this, degassing was carried out in a dessicator until no bubbles could any longer be seen. The specimens were hardened for 2 hours at 75° C.

2. Production of the broadened end faces

The broadened end faces (also termed "mushroom tips") were produced with a self-designed apparatus. This allows precise controlling of the specimen for the immersion and contact pressing.

Figure 2:
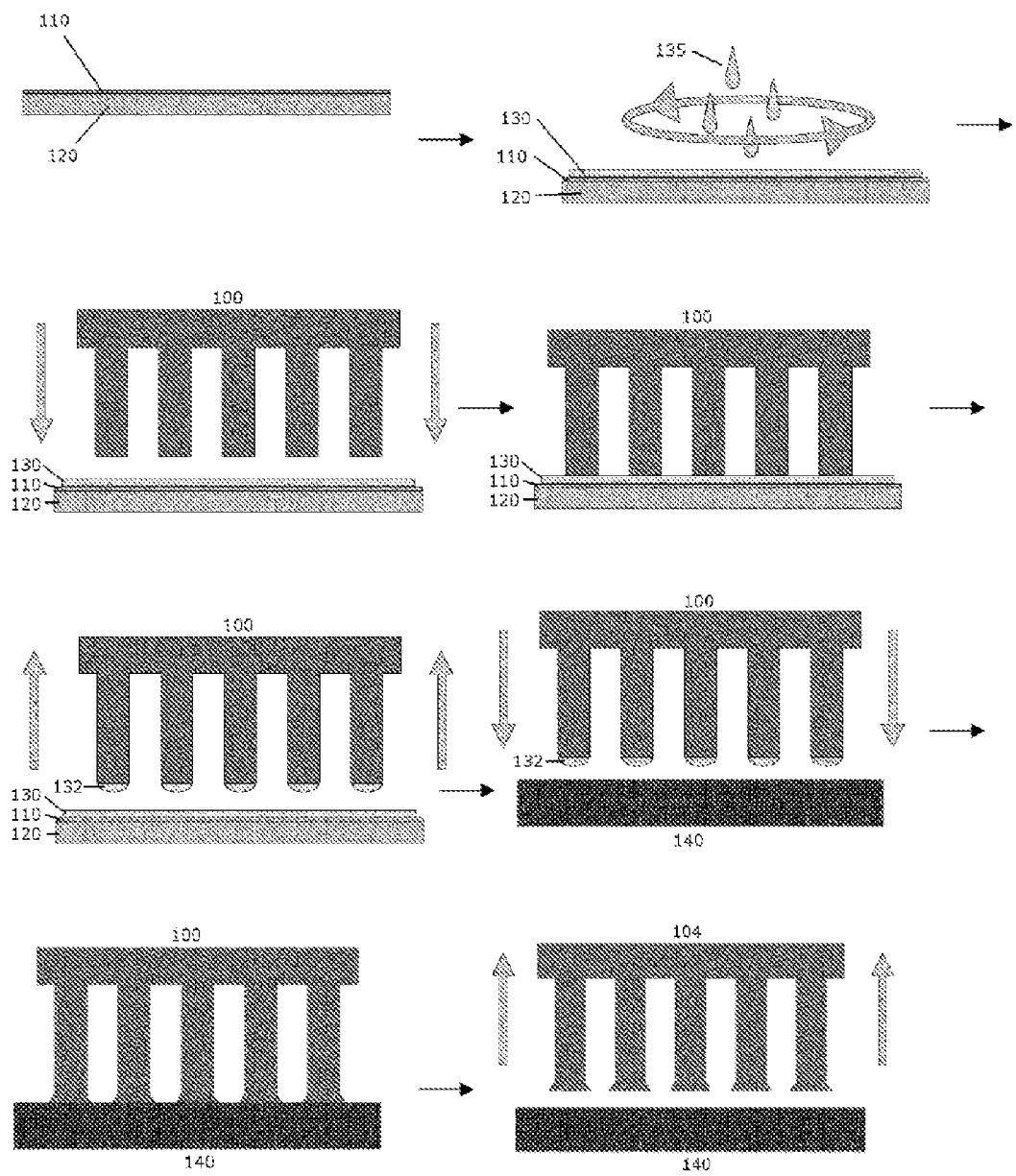
FIG. 2 shows a schematic representation of the method for producing a substrate with projections having broadened end faces.

The method is represented in FIG. 2. In a first step, a substrate 120 is silanized. To this end, the substrate was placed, together with a vessel containing 1 μL trichloro(1H, 1H, 2H, 2H-perfluorooctyl)silane, in a dessicator and a vacuum applied until such time as the silane was fully vaporized. After this, the substrate was treated in an oven for 30 minutes at 95° C. A substrate 120 having a silane layer 110 was obtained.

In the next step, the prepolymer and the crosslinking agent for PDMS was mixed in the ratio of 10:1 (weight ratio) and gas bubbles in the dessicator removed. After this, 0.5 mL of the degassed PDMS 135 were placed in the middle of the substrate of 35 mm diameter and the substrate rotated at 300 rpm, with an acceleration of 5000 rpm/s, for 300s. A 0.5 mm thick layer 130 of liquid PDMS was obtained.

Into this layer 130 were immersed the end faces of the specimens 100 produced in 1. A specimen 100 exhibiting drops of PDMS 132 on the end faces was thereby obtained.

In the next step, this specimen 100 was pressed for 10 minutes against a silanized glass substrate 140, which was heated to 100° C. Specimens 104 having broadened end faces were thereby obtained.

3. Production of the specimens having two types of projections

Figure 3:
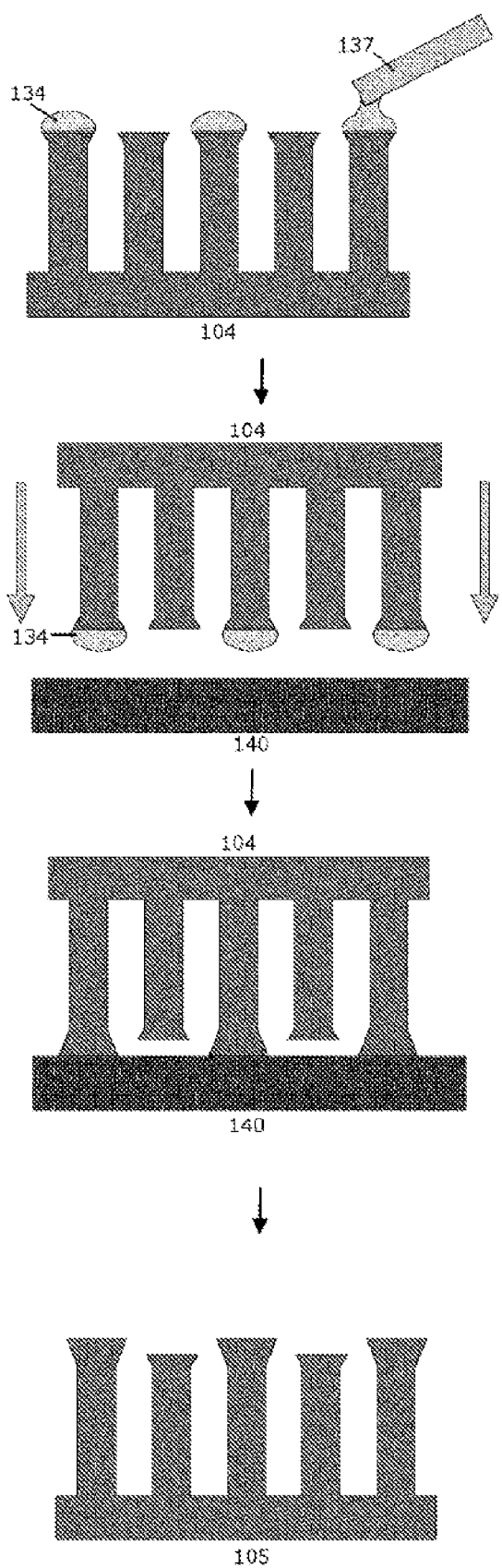
FIG. 3 shows a schematic representation of the method according to the invention for producing a substrate with at least two differently high projections.

The method is represented in FIG. 3.

In a first step, drops of PDMS 134 are applied to defined end faces of a specimen 104. This can be done via a pipette or some other instrument 137. The specimen 104 is then pressed with the drops 134 for 10 minutes against a silanized glass substrate 140, which was heated to 100° C. As a result, conical broadenings are formed on the treated end faces. The treated projections at the same time lengthen somewhat. The obtained specimen 105 therefore has two types of projections, which differ from one another in terms of height. All projections of the specimen 105 have broadened end faces ("mushroom tip").

Figure 4:
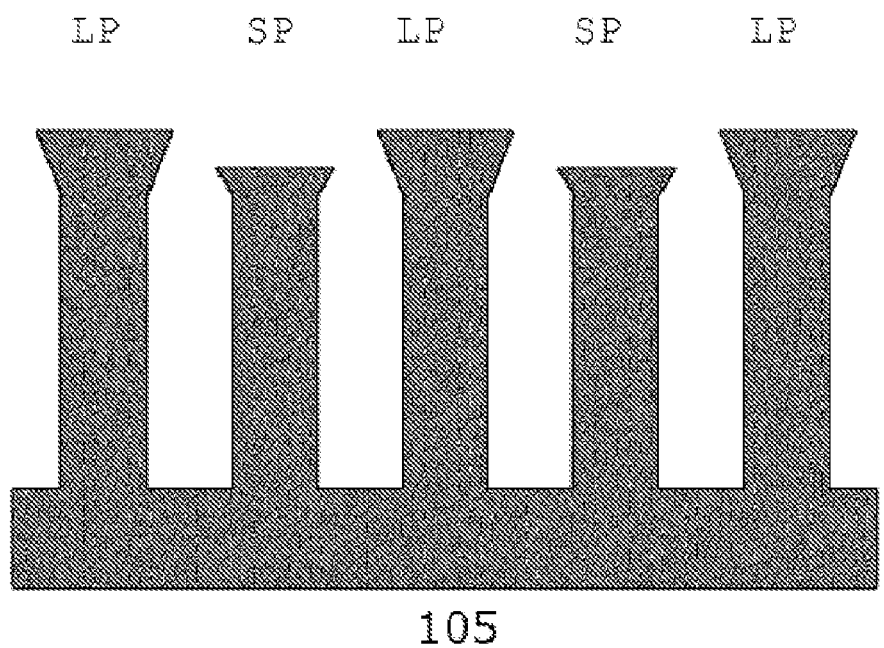
FIG. 4 shows a schematic representation of the specimen 105.

FIG. 4 shows a schematic representation of the specimen 105.

Figure 6:
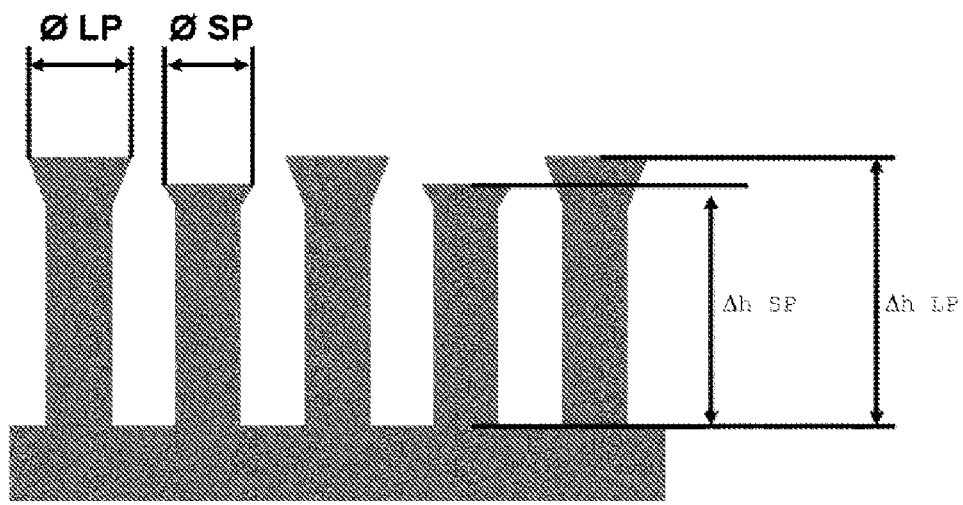
FIG. 6 shows a) a schematic representation of a specimen 105 having the size specifications quoted in the Application; in b) is shown the arrangement of the projections in a specimen.
Figure 6:
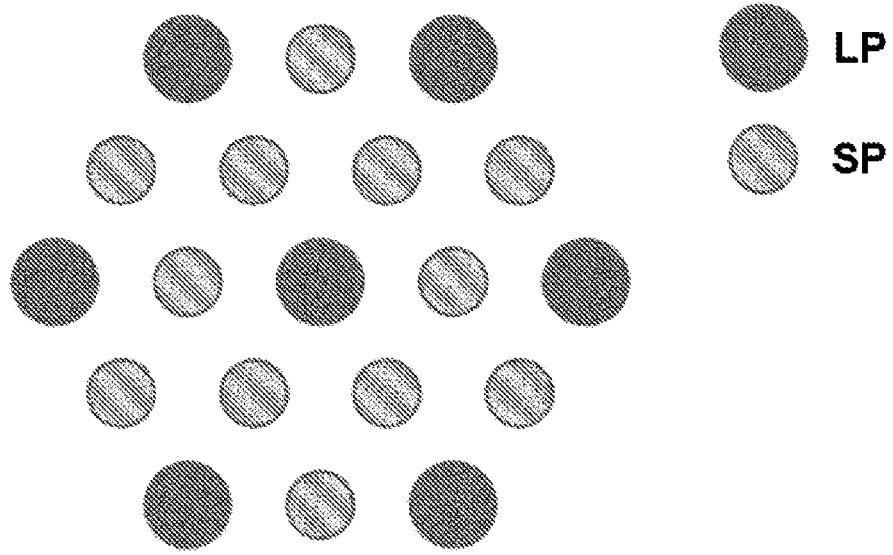

FIG. 6 shows in a) a schematic representation of a specimen having two types of projections. LP here stands for higher and SP for lower projections. The measurement data indicate where the data for diameter and height, quoted in Table 1, were measured. View b) shows the arrangement of the projections in a specimen. The specimen hence comprised 7 LP and 12 SP projections. Each type of projections spans a possible contact area. Through the broadening of the end faces, the diameter was able to be markedly enlarged. In principle, the end faces of the higher projections (LP) span a first contact area in the vertical height Δh LP. The end faces of the lower projections (SP) span a second contact area in the vertical height Δh SP. Both contact areas are parallel to one another and also parallel to the surface on which the projections are disposed.

Figure 7:
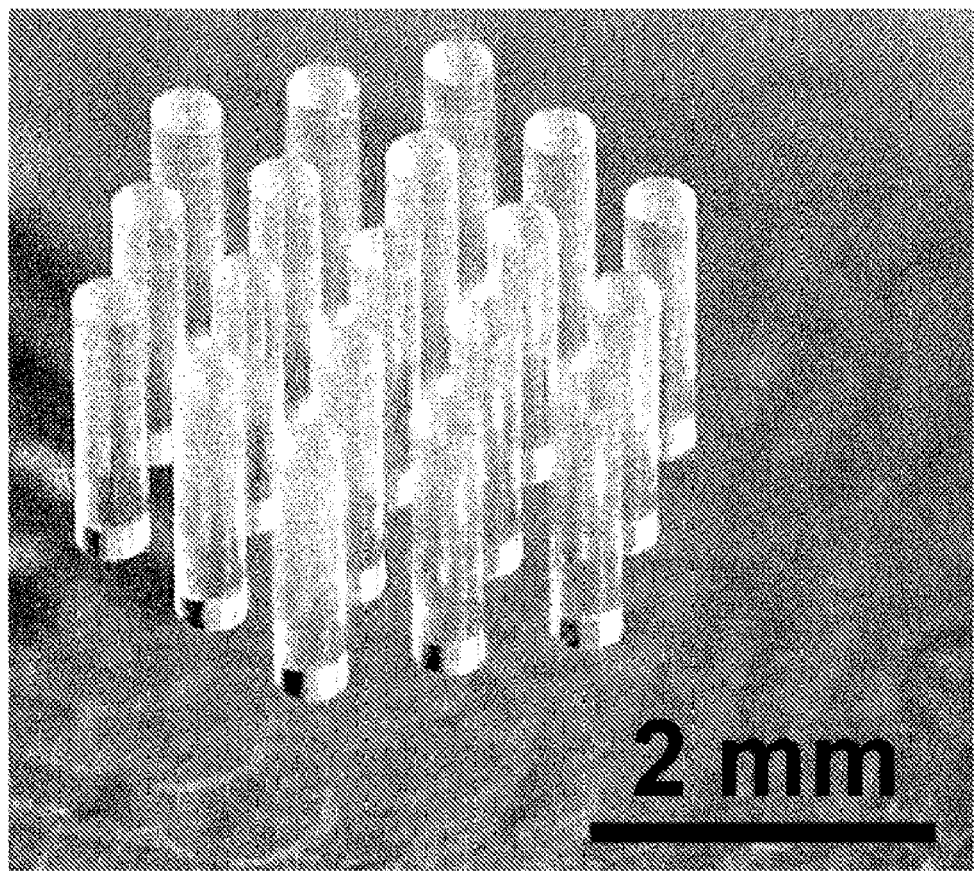
FIG. 7 shows a photograph of a specimen formed out in PDMS, prior to the broadening of the end faces.
Figure 8:
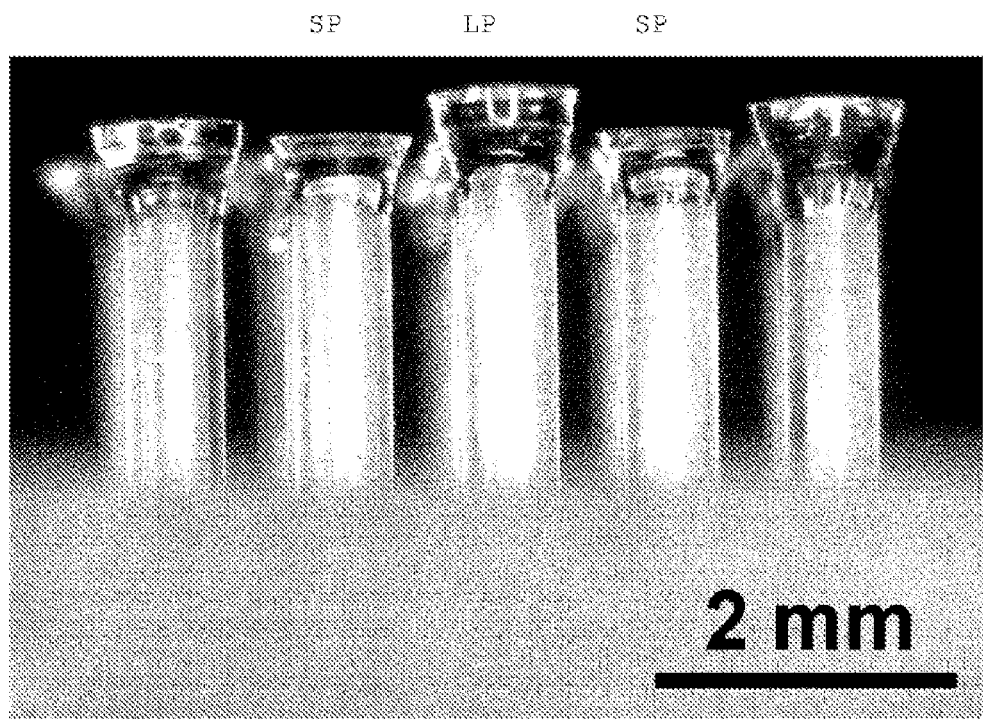
FIG. 8 shows a side view of a specimen having broadened end faces and two types of projections (SP, LP)

FIG. 7 shows a photograph of a specimen, after forming out from PDMS, without broadened end faces. In FIG. 8 is shown a fully treated specimen from FIG. 7 having broadened end faces and two types of projections (SP and LP) in accordance with FIG. 6. The height of the projections was determined with an optical microscope (Keyence VHX-2000D with a VH-Z20R/W lens). The measured values are quoted in Table 1.

4. Adhesion measurements

The measurements were measured with an apparatus according to Kroner, E.; Blau, J.; Arzt E: An adhesion measurement setup for bioinspired fibrillar surfaces using flat probes, Review of Scientific Instruments 2012, 83. The PDMS specimen was here applied to a glass support and fastened in a specimen holder which is displaceable and tiltable with high precision. The forces were determined by measuring the bending of a metallic cantilever having a spring constant of 2524 N/m by means of laser interferometry. The cantilever had a smooth, flat and aligned glass test piece (substrate). For the measurement, the specimen was moved toward the substrate at a specific velocity. Following contact, a predefined (positive) preload was set. After this, the specimen was moved back away from the substrate. The (negative) pull-off force was hereupon measured. The tests were conducted at specimen velocities of 20 µm/s and 60 µm/s. The preload was set such that significant pull-off forces dependent on the preload were measured. All measurements were monitored with an optical camera. All specimens were measured at three different angles of rotation (0°, 120° and 240°), related to the rotational axis perpendicular to the substrate. Effects resulting from misalignment of the specimens in relation to the substrate should thereby be minimized.

Figure 9:
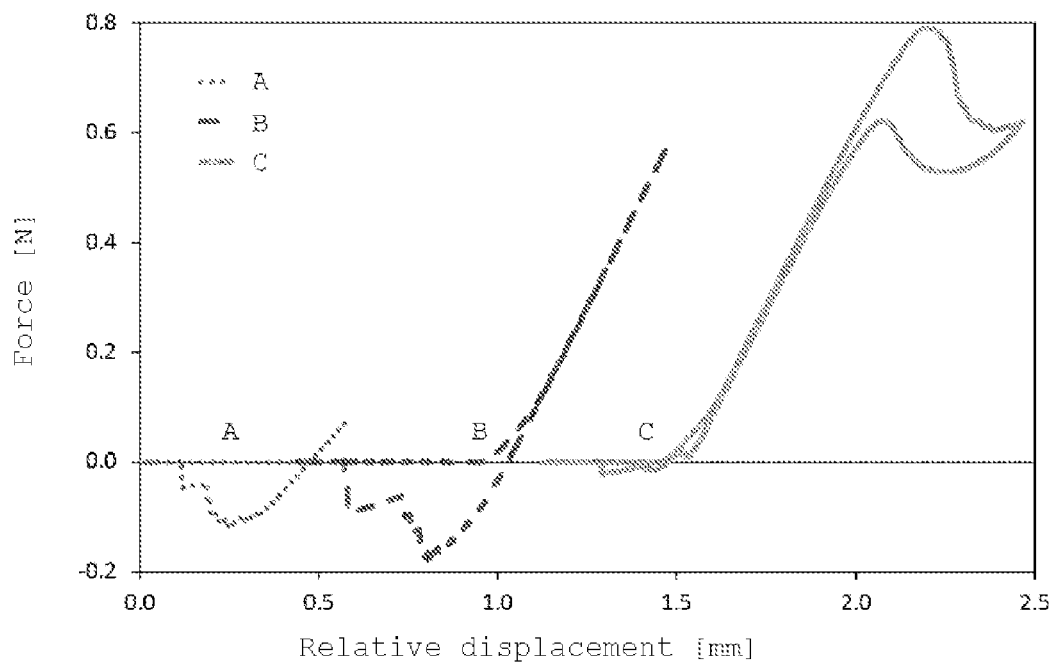
FIG. 9 shows graphs of relative displacement in relation to the force a); b) shows an enlarged detail from illustration a); for better clarity, the curves have been mutually displaced along the X-axis (relative displacement). Usually the increase in force for a specimen is realized with the same displacement for the displacement.
Figure 9:
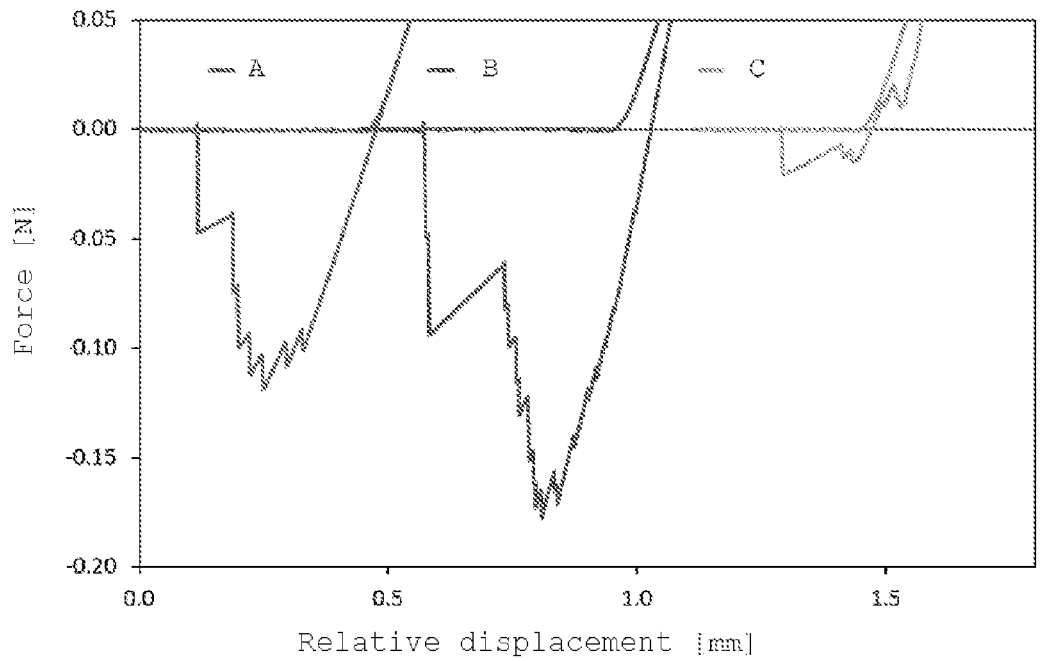

The measurement was conducted for all specimens with the abovementioned apparatus. FIG. 9 shows force-displacement curves for three exemplary measurements with low (A), medium (B) and high preload. The specimens were moved toward the substrate up to the point of contact. After this, the specimen was moved further toward the substrate. The maximum of the pressure load is defined as a preload for the respective measurement. After this, the specimen was moved back away from the substrate. The maximally measured force is regarded as the pull-off force. FIG. 9b) shows the region of the tensile stress of FIG. 9a) in enlarged representation. The dotted/continuous line (A) shows the measurement at low preload. This measurement shows a pattern typical of structured specimens. It shows a uniform pattern in the region of the compression (in the movement toward the substrate) and a sawtooth-like pattern in the region of the tensile stress (movement away from the substrate). Together with the optical observation, the individual minima were able to be assigned to the detachment of the individual projections (LP). In the case of FIG. 9, there are 7 detachments. The preload was not high enough to contact the second type of projections (SP) with the substrate.

The dashed/continuous line (B) shows a measurement with medium preload. Initially, the specimen has contact only with the higher projections (LP). The curve shows in this region the same pattern as at low preload. Then, at a force of about 0.08 N, the gradient of the curve suddenly increases. The optical observation shows that, at this force, the shorter projections (SP) reach the substrate. This means that the longer projections (LP) are then compressed correspondingly strongly. The preload was further increased somewhat and the specimen then moved back away from the substrate. It is evident that, in the region of the tensile load, a markedly higher pull-off force was measured. Moreover, 19 minima were able to be assigned to the individual projections. The optical observation showed that initially the shorter projections (SP) detach themselves, and afterward the longer projections (LP).

The third curve (C) shows the measurement at high preload and shows a markedly different pattern. At low load, the curve follows the pattern of the medium preload, i.e. initially low gradient and rise in the gradient through contacting of the shorter projections (SP). At a specific critical load (here about 0.8 N), the maximum preload is achieved. Further displacement leads to a decrease in load. The optical observation shows that this is attributable to a reversible buckling of the projections. During the decrease in load, the curve shows a clear hysteresis. The optical observation shows that the projections initially assume their original straight form. If the load is reduced further and a tensile load is applied, the specimen detaches itself immediately from the substrate, in some cases even prior to reaching the original position. The number of minima in the curve is much lower and the minima appear blurred. The resulting pull-off force is very low.

Figure 10:
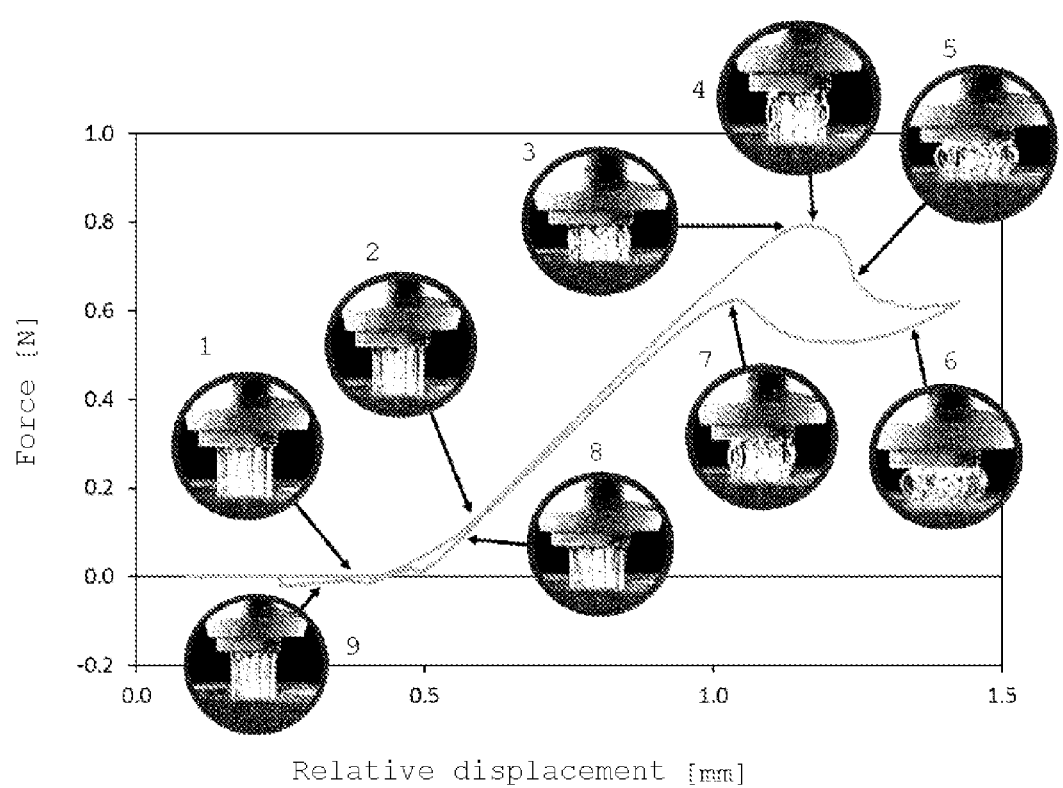
FIG. 10 shows the assignment of the different points of a force/displacement graph to photographic images of the specimen.

FIG. 10 shows a measurement with high preload with associated illustrations of the specimen in the various phases of the measurement. Under 1, the specimen is moved toward the surface. Contact is made and the force increases. At 2, the gradient of the curve rises, since also the shorter projections come into contact with the substrate. At 3, the maximum preload is reached and the projections begin to kink and yield. This leads to a decrease in the force 5. In the rearward movement 6 too, the force initially decreases, so as then to rise again 7 when the projections regain the straight form. At 8, the force decreases further, before the specimen, without strong adhesion 9, detaches itself from the substrate.

Figure 11:
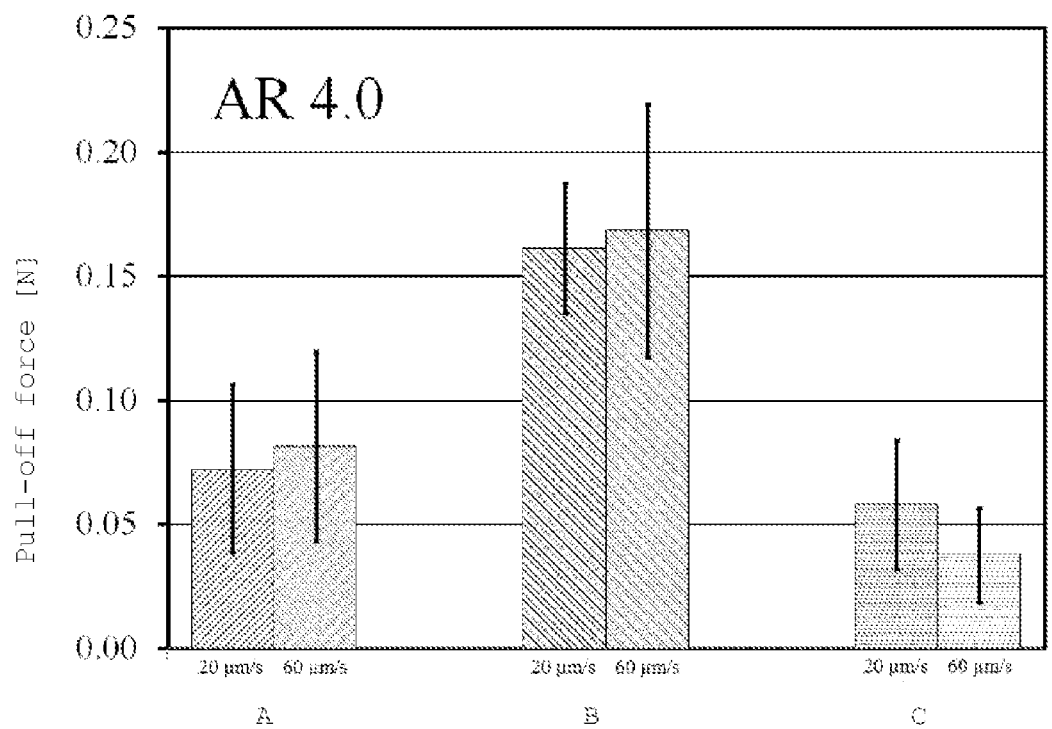
FIG. 11 shows measured adhesive forces for a specimen with AR 4.0 at different velocities (20 µm/s; 60 µm/s); The specimens correspond to the measurements with low preload (A), medium preload (B) and high preload (C)
Figure 12:
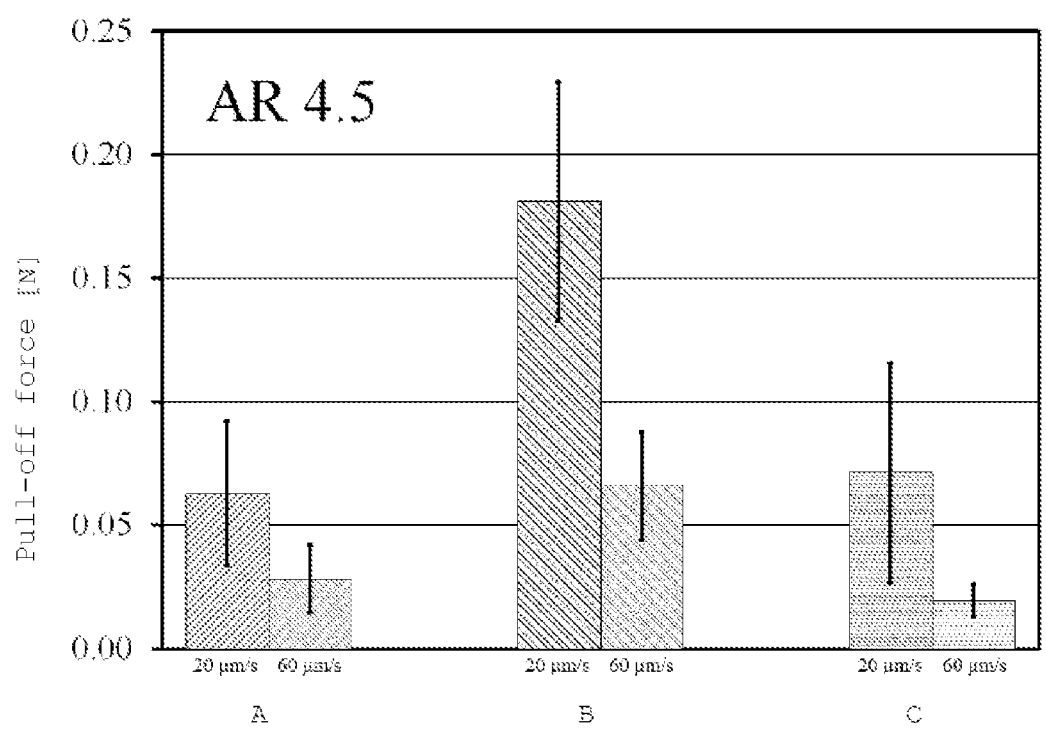
FIG. 12 shows measured adhesive forces for a specimen with AR 4.5 at different velocities (20 µm/s; 60 µm/s); The specimens correspond to the measurements with low preload (A), medium preload (B) and high preload (C)
Figure 13:
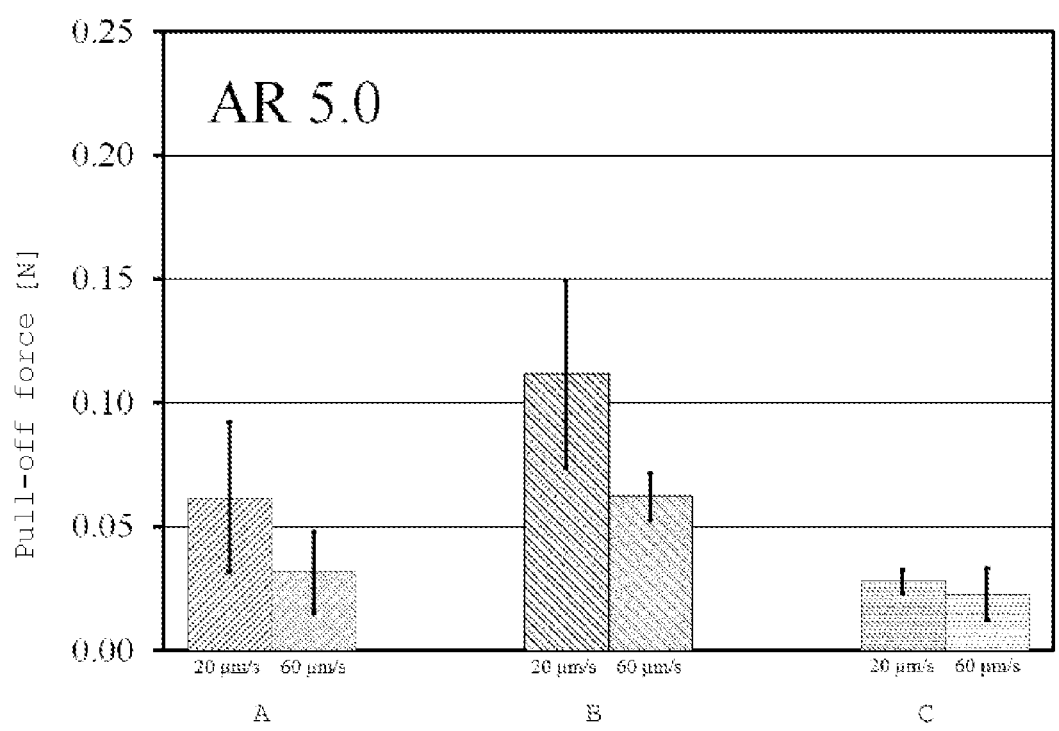
FIG. 13 shows measured adhesive forces for a specimen with AR 5.0 at different velocities (20 µm/s; 60 µm/s); The specimens correspond to the measurements with low preload (A), medium preload (B) and high preload (C)
Figure 14:
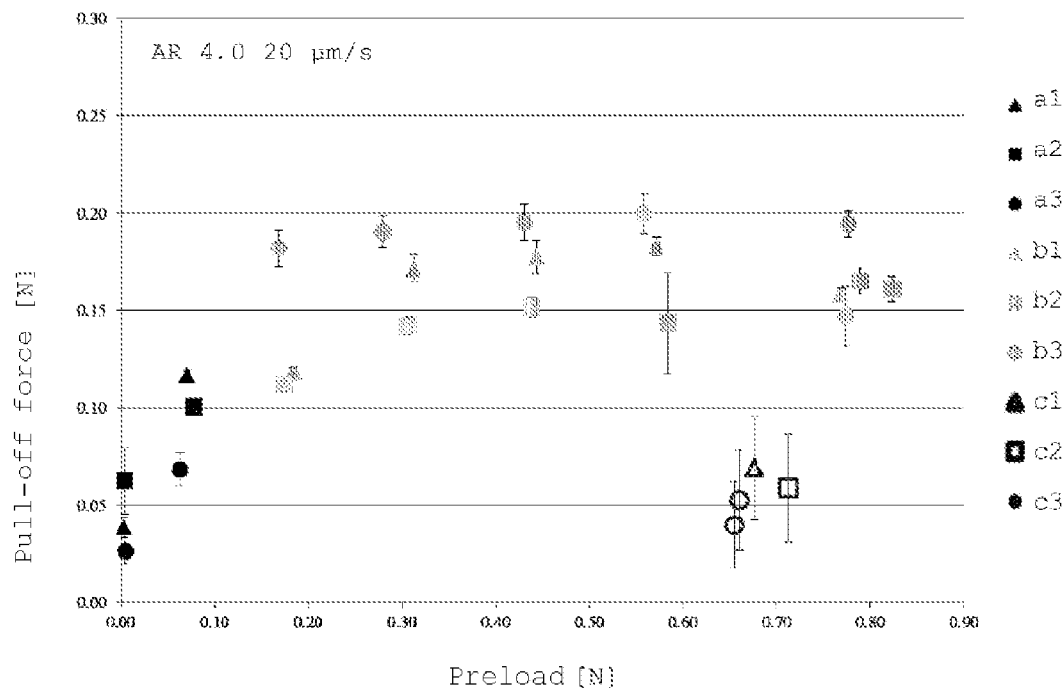
FIG. 14 shows pull-off force in relationship to the preload of a specimen with AR 4.0 at a velocity of 20 µm/s.
Figure 15:
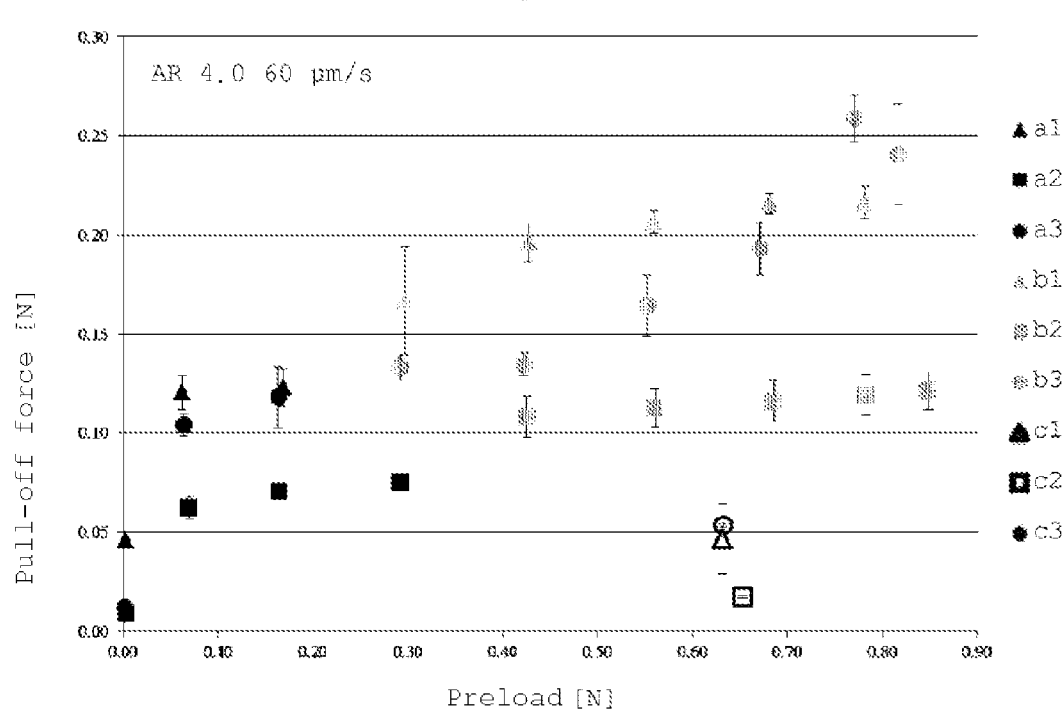
FIG. 15 shows pull-off force in relationship to the preload of a specimen with AR 4.0 at a velocity of 60 µm/s.
Figure 16:
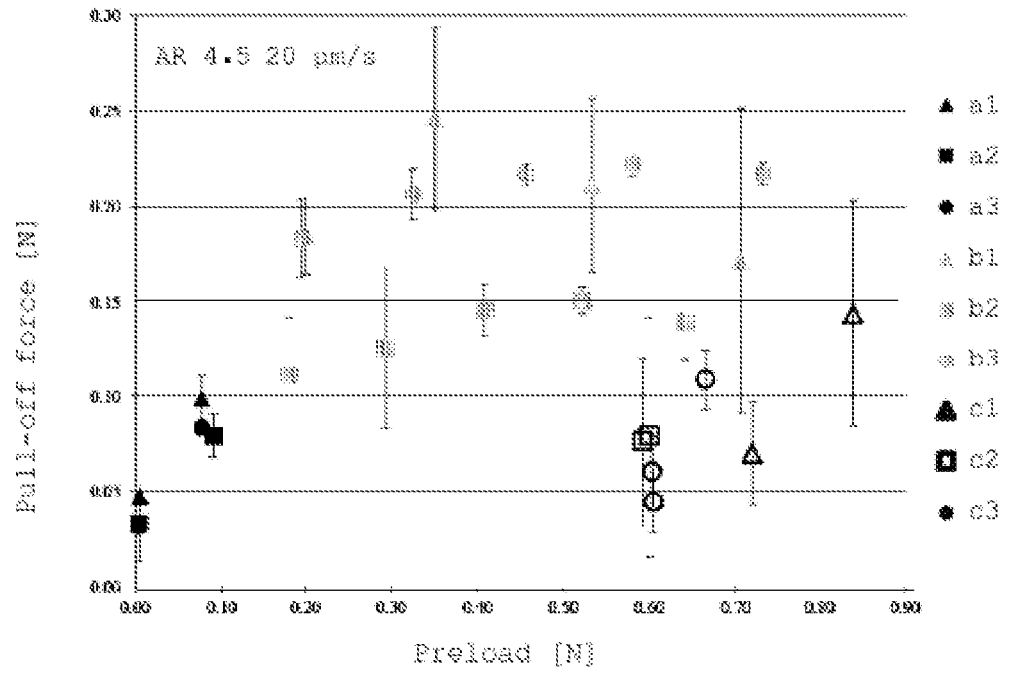
FIG. 16 shows pull-off force in relationship to the preload of a specimen with AR 4.5 at a velocity of 20 µm/s.
Figure 17:
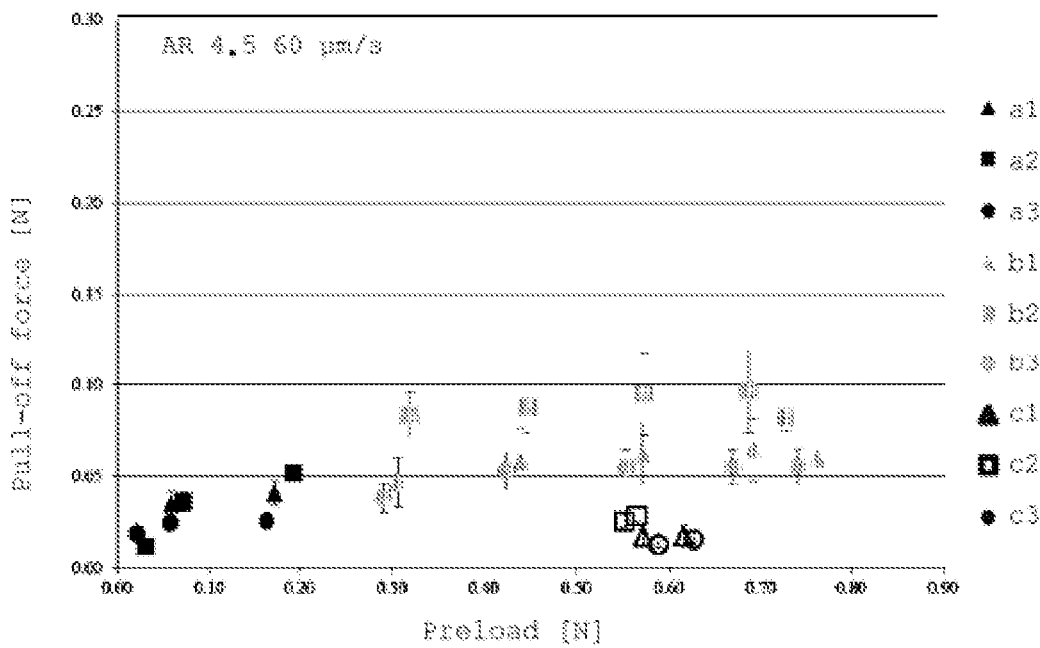
FIG. 17 shows pull-off force in relationship to the preload of a specimen with AR 4.5 at a velocity of 60 µm/s.
Figure 18:
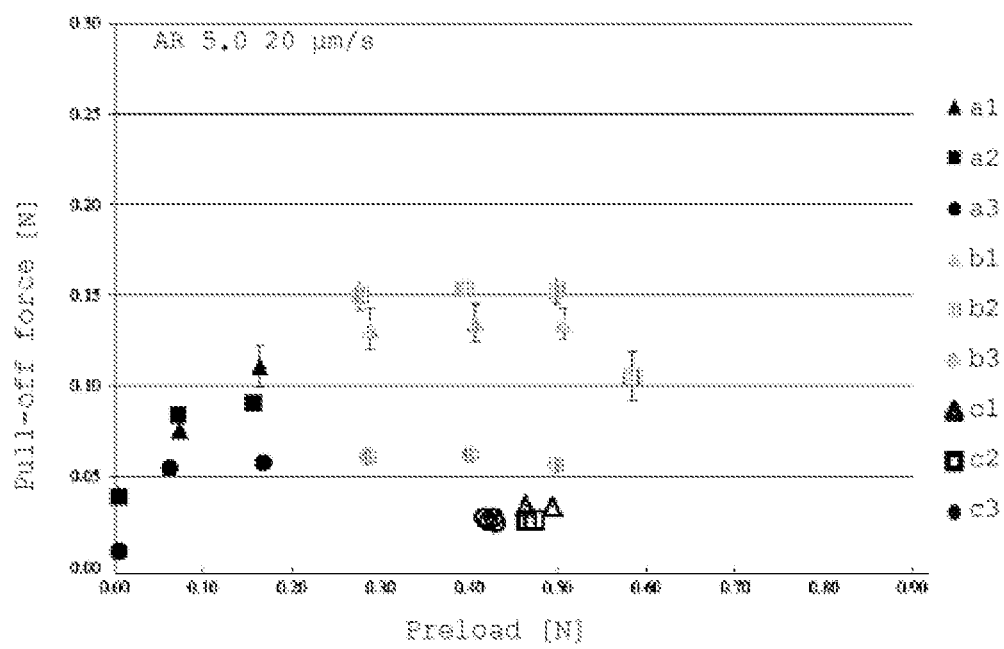
FIG. 18 shows pull-off force in relationship to the preload of a specimen with AR 5.0 at a velocity of 20 µm/s.
Figure 19:
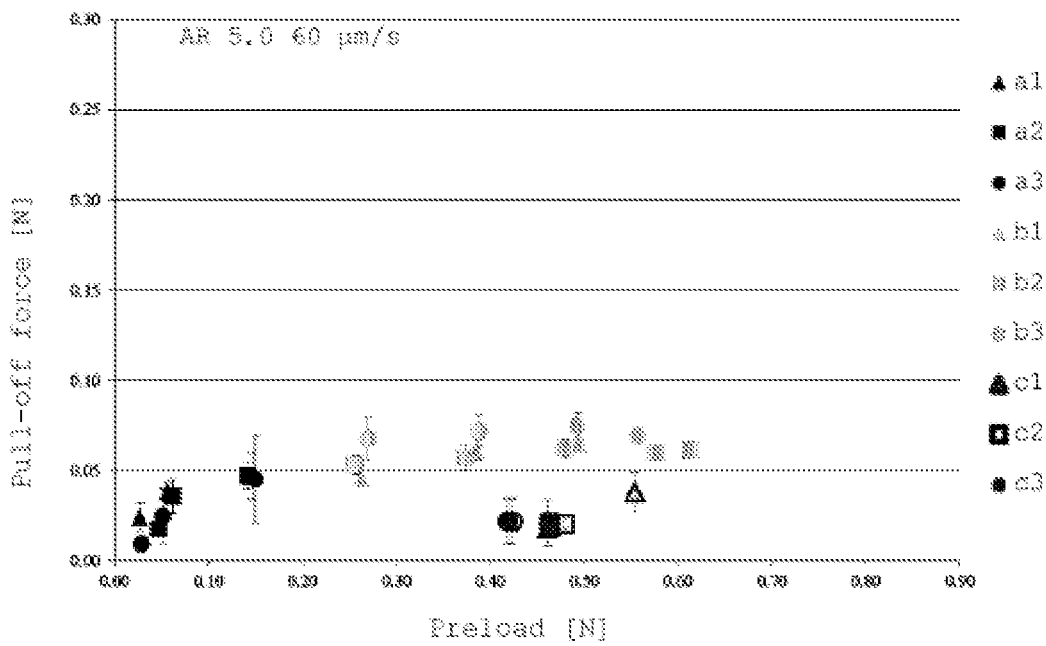
FIG. 19 shows pull-off force in relationship to the preload of a specimen with AR 5.0 at a velocity of 60 µm/s.

FIGS. 11-13 combine all adhesion experiments for three different aspect ratios (AR) (AR 4.0, AR 4.5, AR 5.0) at the velocity of 20 µm/s and 60 µm/s. The specimens correspond to the measurements with low preload (A), medium preload (B) and high preload (C).

From the experiments, the following conclusions are able to be drawn:

For each of the tested aspect ratios, the three types of adhesion control were able to be detected in dependence on the preload (A, B, C). Low preload leads to low pull-off force, medium preload to high pull-off force, and high preload to very low pull-off force. Even though in some few cases the pull-off force of A is similar to C, the general trend is clearly discernible.

The more rapid is the movement of the specimen during the measurement, the lower is the pull-off force. For the specimen with AR 4.0, the pull-off force is similar. For the other specimens with AR 4.5 and 5.0, there are clear differences.

With increasing aspect ratio, the pull-off force decreases. The specimen with AR 4.0 shows the highest adhesion, while the specimen with AR 5.0 has markedly lower adhesion.

The individual types of adhesion for the specimens according to the invention can here be described as follows.

At low preload, only the longest projections enter into contact with the substrate. The adhesion of the specimen is therefore in principle dependent on the number of long projections. As a result, more end face is available for the adhesion at low preload.

At medium preload, the load results in a compression of the longer projections until also the shorter projections come into contact with the surface. This leads to a sudden rise in the number of projections which are in contact with the substrate. This has essentially two effects. On the one hand, the effective stiffness of the specimen increases. This manifests itself in the rise in gradient of the force/displacement curve. On the other hand, the contact area of the specimen suddenly increases. This leads to a marked increase in the pull-off force and the adhesion work. Unlike the adhesion at low preload, it is expected that the pull-off force for medium preload depends, inter alia, on the number of types of projections which are involved in the contacting, the height difference between the types of projections, and the aspect ratio.

If the preload exceeds a specific value, the projections begin to bend and to kink. This is preferredly reversible.

The bending also affects the end face of the projection. It results in a loss of contact of the end face with the substrate and to a decrease in the adhesion.

5. Analysis of the adhesion

A specimen has two types of projections, having two different vertical heights of the end faces.

If the preload $P_p$ lies below the threshold value $P_{p,1}$, the load is not sufficient for the longer projections LP to be compressed in such a way that the shorter projections SP make contact with the surface. The pull-off force $P_c$ is then simply dependent on the number of LP, $n_{LP}$, which were in contact with the surface, multiplied by the adhesive force $F_{LP}$ which, in respect of each projection LP, is necessary for the detachment:

$$\text{For } P_p < P_{p,1} \quad P_c = F_{LP} * n_{LP} \qquad (1)$$

As soon as the load $P_{p,1}$ is reached, the second type of projections SP comes into contact with the surface. Depending on the number of projections ($n_{SP}$), these contribute to the adhesion with an additional force $F_{SP}$. However, the longer projections LP must be compressed in order to enable the contact of the other projections. This elastic energy is stored in LP and reduces the adhesion. The resultant force which is exerted on the surface by the stored energy is identical with the force for compressing the projections $F_{compr.LP}$ multiplied by the number of LP.

$$\text{For } P_{p,1} < P_p < P_{p,2} \quad P_c = F_{LP} * n_{LP} + F_{SP} * n_{SP} - F_{compr.LP} * n_{LP} \qquad (2),$$

wherein $P_{p,2}$ is the load at which the projections begin to kink.

At high preload beyond the load $P_{p,2}$, the pull-off force falls to the "buckling pull-off force" $P_{c,buck}$.

$$\text{For } P_p > P_{p,2} \quad P_c = P_{c,buckling} * (n_{LP} + n_{SP}) \qquad (3)$$

Therefore, by measurement of the adhesive force of a short projection and a long projection, as well as of the force necessary for the compression of the long projection, all necessary parameters for describing the switchable adhesion of such a specimen are determined. The adhesive forces of the projections $F_{LP}$ and $F_{SP}$ are for circular projections dependent on the radius r and the aspect ratio AR. The force for the compression $F_{compr.Lp}$ depends, above all, on the aspect ratio AR and the modulus of elasticity E of the projection. A coupling between the projections or a possible length dependence of the bending of the projections is conceivable, yet is not described in this simplified model.

As shown in FIGS. 11 to 13, the aspect ratio and the velocity influence the adhesion of the specimen. In the present invention, it was discovered that an increase in the aspect ratio leads to reduction of the adhesion. While the differences at AR 4.0 and 4.5 are negligible, the specimens with AR 5.0 show a markedly lower adhesion. A possible explanation could lie in the fact that longer projections, in relation to the bending and kinking, are less stable than shorter projections. This could be corrected by adapting the modulus of elasticity.

The velocity dependency could also by explained by the material PDMS which is used. At load frequencies between 0.1 and 100 Hz, PDMS can exhibit viscoelastic behavior. This can on the one hand alter the elasticity in the compression, but also alter the contacting of the surface. Both effects can influence the adhesion.

FIGS. 14, 15, 16, 17, 18 and 19 show the measured pull-off force in dependence on the preload for respectively 3 specimens of the respective aspect ratios AR 4.0, AR 4.5 and AR 5.0 at different velocities. The obtained results were assigned to the different adhesion modes (A, B or C). Here a1, a2, a3 signify the measurement of the specimen 1, 2 or 3 assigned to adhesion mode A (i.e. low preload, adhesion only by LP). The measurements b1, b2, b3 stand for specimen 1, 2, and 3 respectively, assigned to adhesion mode B (i.e. medium preload, adhesion by SP and LP). The measurements c1, c2, c3 stand for specimen 1, 2, and 3 respectively, assigned to adhesion mode C (i.e. high preload, decrease in the adhesion as a result of kinking and bending of the projections).

TABLE 1

|  | Height SP [μm] | Height LP [μm] | Δ h [%] | Diameter SP [μm] | Diameter LP [μm] | Δ diameter [%] |
|---|---|---|---|---|---|---|
| AR 4.0 | 1594 | 1697 | 6.5 | 567 | 634 | 11.8 |
| AR 4.5 | 1796 | 1876 | 4.5 | 621 | 684 | 10.1 |
| AR 5.0 | 1983 | 2100 | 5.9 | 635 | 681 | 7.2 |

REFERENCE SYMBOLS 100 structured surface
104 structured surface having projections with broadened end faces
105 structured surface having two types of projections, which differ from one another in terms of their vertical height
110 silane layer for the passivation
120 substrate
130 liquid PDMS
132 drops of PDMS
134 drops of PDMS
135 PDMS
137 tool for applying PDMS
140 heated surface
200 structured surface
205 surface
210 trunk/projection
215 end face
220 trunk/projection
225 end face
230 substrate
500 projection
502 end face
504 base surface
506 overlap region

CITED LITERATURE

D. Paretkar, M. Kamperman, A. S. Schneider, D. Martina, C. Creton, E. Arzt, Materials Science and Engineering: C 2011, 31, 1152.
M. Varenberg, S. Gorb, Journal of the Royal Society Interface 2008, 5, 785.

D. Paretkar, A. S. Schneider, E. Kroner, E. Arzt, Mrs Communications 2011, 1, 53.

The invention claimed is:

1. A structured surface of a solid with switchable adhesion, comprising:
   a surface having at least two types of projections, each projection extending from the same surface and having at least a trunk with an end face pointing away from the surface, wherein:
   the at least two types of projections differ from one another at least in terms of a vertical height of the end face, said at least two types of projections being perpendicular to the same surface; and
   the material of the projections has a modulus of elasticity such that, depending on the load, one or more types of projections form via their end faces an adhesive force which is higher than the force exerted by the possible compression of the projections; and
   at least one type of projections has an aspect ratio such that, if a specific load is exceeded, these projections buckle and the adhesive force, as a result of buckling of the end faces, decreases,
   wherein no projection of one type is adjacent to only projections of the same type.

2. The structured surface as claimed in claim 1, wherein at least one type of projections has broadened end faces.

3. The structured surface as claimed in claim 1, wherein the projections have an aspect ratio of height to diameter of 1 to 100.

4. A method for modifying the surface of an object in order to obtain a surface with switchable adhesion, wherein the surface is subjected to a structuring, so that a multiplicity of projections, which respectively have at least a trunk, is formed, wherein the trunk possesses an end face pointing away from the surface, wherein:
   the multiplicity of projections comprises at least two types of projections, which differ from one another at least in terms of the vertical height of the end face from the same surface, said at least two types of projections being perpendicular to the same surface; and
   the material of the projections has a modulus of elasticity such that, depending on the load, one or more types of projections form via their end faces an adhesive force which is higher than the force exerted by the possible compression of the projections; and
   at least one type of projections has an aspect ratio such that, if a specific load is exceeded, these projections buckle and the adhesive force, as a result of buckling of the end faces, decreases,
   wherein no projection of one type is adjacent to only projections of the same type.

5. A method for producing a structured surface having at least two types of projections extending from the same surface, which differ from one another at least in terms of their vertical height and which are perpendicular to the same surface, comprising:
   a) provision of a structured surface having at least one type of projections;
   b) application of a hardenable material to the end faces of at least some of the projections;
   c) contacting of the projections having the hardenable material with a model for the end face of elevated projections;
   d) hardening of the hardenable material, with formation of the elevated projections; and
   e) detachment of the structured surface from the model, wherein no projection of one type is adjacent to only projections of the same type.

6. A method for switching the adhesion of a surface as claimed in claim 1, comprising:
   contacting the structured surface with a substrate, wherein there are at least three different states of adhesion:
   contacting a first type of projections having the highest vertical height and formation of a low adhesion;
   compression of the contacted first type of projections up to the point of contact of a second type of projections having the next lower vertical height, and increasing the adhesion;
   increasing the force up to the bending over of at least some of the projections and strong decrease in the adhesion.

7. A composite of two bodies, wherein the interface has a structured surface as claimed in claim 1.

8. The structured surface as claimed in claim 1, wherein the distance between any two projections is less than 2 mm.

9. The structured surface as claimed in claim 1, wherein the vertical height of the multiplicity of projections lies within a range from 1 µm to 2 mm.

10. The structured surface as claimed in claim 1, wherein at least one type of projections has end faces comprising monomers of polymers, silanes or silicones.

11. The structured surface as claimed in claim 1, wherein at least one type of projections has end faces comprising silanes or silicones.

12. The structured surface as claimed in claim 1, wherein the multiplicity of projections comprise polydimethylsiloxane.

13. The structured surface as claimed in claim 1, comprising:
   short projections comprising polydimethylsiloxane and having a first vertical height of the end faces from the same surface, the end faces of said short projections being parallel to the surface; and
   long projections comprising polydimethylsiloxane and having a second vertical height of the end faces from the same surface greater than said first vertical height, the end faces of said long projections being parallel to the surface; and
   wherein at least one type of projection has an aspect ratio of height to diameter of 1 to 100.

14. The structured surface as claimed in claim 1, wherein said end face is parallel to the surface.

15. The structured surface as claimed in claim 1, wherein each projection is in the form of a pillar.

16. The structured surface as claimed in claim 1, wherein each projection comprises a base surface and an end face opposite to and parallel to said base surface.

17. The structured surface as claimed in claim 1, wherein the trunk and the end face of each projection have a circular or oval cross section.

18. The structured surface as claimed in claim 1, wherein the trunk and the end face of each projection have a rectangular, square, rhombic, hexagonal, or pentagonal cross section.

19. The structured surface as claimed in claim 1, wherein each projection extends from a common surface or base.

20. The structured surface as claimed in claim 1, wherein the at least two types of projections differ in vertical height of the respective end face prior to contact with a substrate.

21. The structured surface as claimed in claim 1, wherein the at least two types of projections are arranged on the same surface such that a first type of projection is always surrounded by at least one projection of a different type.

22. The structured surface as claimed in claim 1, wherein each projection of one type is surrounded by at least one projection of a different type.

* * * * *